United States Patent [19]
Fuller et al.

[11] Patent Number: 5,224,156
[45] Date of Patent: Jun. 29, 1993

[54] METHOD AND APPARATUS FOR FACSIMILE ENHANCEMENT

[75] Inventors: Gary V. Fuller, Rockwall; George P. Shrime, Dallas; Sharbil J. Hamati; J. Michael Lyell, both of Garland; Alvin Heard, Richardson, all of Tex.

[73] Assignee: Electronic Modules, Inc., Dallas, Tex.

[21] Appl. No.: 555,251

[22] Filed: Jul. 19, 1990

[51] Int. Cl.⁵ .......................................... H04M 11/00
[52] U.S. Cl. ..................... 379/100; 379/88; 358/407; 358/438; 358/440
[58] Field of Search ............ 379/100, 67, 88, 89, 379/93, 96-98, 100; 358/400, 402, 403, 407, 434-436, 438, 440

[56] References Cited

U.S. PATENT DOCUMENTS

| | | | |
|---|---|---|---|
| 4,056,111 | 3/1985 | Takenouchi et al. | 379/96 |
| 4,331,983 | 5/1982 | Burton et al. | 379/100 |
| 4,748,662 | 3/1988 | Hirata | 379/100 |
| 4,794,637 | 12/1988 | Hashimoto | 379/100 |
| 4,837,798 | 6/1989 | Cohen et al. | 379/94 |
| 4,900,902 | 2/1990 | Sakakibara | 379/100 |
| 4,926,462 | 5/1990 | Ladd et al. | 379/67 |
| 4,932,042 | 6/1990 | Baral et al. | 379/67 |
| 4,935,955 | 6/1990 | Neudorfer | 379/100 |
| 4,994,926 | 2/1991 | Gordon et al. | 358/400 |
| 5,008,926 | 4/1991 | Misholi | 379/100 |

FOREIGN PATENT DOCUMENTS

| | | | |
|---|---|---|---|
| 56-72567 | 6/1981 | Japan | 379/100 |
| 64-1363 | 1/1989 | Japan | 379/100 |
| 2-2266 | 1/1990 | Japan | 379/100 |
| 2211698 | 7/1989 | United Kingdom | 379/100 |

Primary Examiner—James L. Dwyer
Assistant Examiner—Wing F. Chan
Attorney, Agent, or Firm—Richards, Medlock & Andrews

[57] ABSTRACT

A method and apparatus for causing a message sent in facsimile compatible form over a telephone system from a first location to a second location to be received at the second location in a confidential manner such that only the intended recipient may view the message when he so desires. The intended recipient is notified when a facsimile message has been received for him and the recipient may retrieve the facsimile message remotely.

18 Claims, 6 Drawing Sheets

METHOD AND APPARATUS FOR FACSIMILE ENHANCEMENT

TECHNICAL FIELD OF THE INVENTION

This invention relates generally to the transmission and reception of facsimile data and image information. More particularly, but not by way of limitation, this invention relates to a method and apparatus for enhancing the capabilities of a facsimile machine and controlling the transmission and reception of facsimile data and image information.

BACKGROUND OF THE INVENTION

In today's business environment, the need to send and receive information in a matter of minutes rather than hours or days is an ever increasing requirement. Because this need exists, the use of facsimile data and image transmission is one of the fastest growing areas of office automation.

Even though facsimile provides the capability to send and receive information quickly, there are at least two shortcomings associated with the conventional facsimile apparatus and the associated transmission and reception of data and images. The first shortcoming concerns the reception of confidential information and the second shortcoming concerns the notification of the individual that facsimile information has arrived and the delivery of the facsimile information to the individual for whom the facsimile information is intended.

Regarding the first shortcoming which concerns the reception of confidential information, much of this information transmitted and received via facsimile is of a very private and sensitive nature. As this market segment grows, so does the need for confidentiality of this information. In other areas of communication such as mail, envelopes are sealed by the sender to be opened only by the addressee. In voice communication, the telephone line is deemed to provide an acceptable level of confidentiality for most users. In facsimile transmission, however, the facsimile machine will receive and print out the data, message and/or image information (usually in a common or public area because of multiple users) and the designated recipient does not know of the arrival of the facsimile information until notified by the sender or by someone who has read and examined the facsimile information.

Technology existing today which addresses the problem with conventional facsimile equipment is extremely limited. There exists prior art which provides memory for the receipt of facsimile information into storage for later retrieval by the person for whom the information in intended. These machines, however, use a proprietary communication method between the sender's and receiver's equipment. This requirement means the sender must have the same brand facsimile machine if confidential transmission is to take place. If the machines have different manufacturers then confidential transmission into memory can not be accomplished. This restriction imposes a defacto limitation to virtually a closed network of senders and receivers.

There exists a growing need to be able to receive facsimile information into an apparatus capable of storing the facsimile information until the intended recipient is present to receive the information. The present invention eliminates the requirement for the sender and receiver to have the same manufacturer of facsimile machines. This invention will allow the person who has the need to receive confidential information to receive it from any facsimile machine regardless of the make or model of the machine. After the invention has received the facsimile information and stored same into memory, the intended recipient can then identify himself to the inventive apparatus via a special access code which he has selected and then, and only then, will the information be printed out on the facsimile machine.

Regarding the second shortcoming which concerns the notification of and the delivery to the intended recipient the received facsimile information, many times the facsimile information or message arrives but the intended recipient is unaware of its arrival and valuable time is lost. A problem also exists for the person who is not at the location of the receiving facsimile machine. This person could be anyone who spends time away from the office such as a salesman, repairman, businessman who spends time at multiple locations or even the businessman who travels or has left the office for the day. The need exists for a device which will notify the person who has been sent a facsimile message that such a message has been received and then be capable of delivering that facsimile message to another location where the individual is located.

The present invention provides apparatus capable of receiving facsimile data, storing that data in memory, notifying the person to whom the facsimile data was sent and then sending that facsimile data either automatically or on demand to the person to which the facsimile data was addressed.

SUMMARY OF THE INVENTION

This invention provides a method and apparatus for the control of the reception, storage, notification to the intended recipient, retrieval and printing of facsimile messages or information of a confidential nature such that only the intended recipient is privy to the information. The control is provided by delivery command signals in the form of encoded DTMF tones or tone-pair signals from the telephone keypad which control the apparatus. The apparatus stores the confidential facsimile information in memory locations and a 4-digit access code is required to remove the confidential facsimile information from the memory location.

In one aspect, the user can cause a facsimile message sent to him to be delivered to a memory location and not be printed out on the facsimile machine until he is present and provides a proper code which allows the facsimile message to be printed only in his presence.

In another aspect, the user can cause facsimile messages sent to him to be delivered to a memory location and that he be notified that he has a facsimile message waiting for him. The notification can take the form of a recorded voice message, DTMF tone signals, a hardcopy message or a voice mail message.

In another aspect, the user can retrieve his facsimile message or messages by having his local facsimile machine forward his facsimile message to him at a remote facsimile machine immediately upon receipt by his local facsimile machine, retrieve his facsimile message by having the local facsimile machine print out a hard copy of the message or retrieve a hard copy at a remote facsimile machine by commands sent from the remote telephone keypad.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
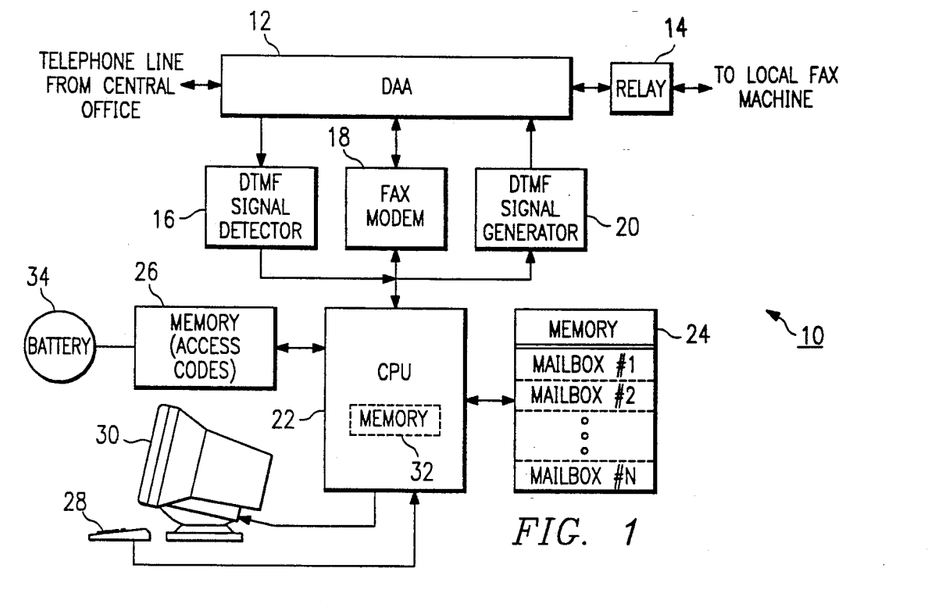
FIG. 1 is a simplified block diagram showing the facsimile enhancement apparatus in accordance with one embodiment of the present invention.

Referring to the drawing and FIG. 1 in particular, shown therein and generally designated by the reference character 10 is facsimile enhancement apparatus in accordance with one embodiment of the invention. The facsimile enhancement apparatus 10 is removably connected between the telephone line jack of the telephone line to the phone company and the telephone line plug of the local facsimile (fax) machine (transceiver) using the standard plug and jack arrangement. As illustrated, the facsimile enhancement apparatus 10 comprises a DAA (Data Access Arrangement) 12 in series with a normally-closed relay 14 operatively connected between the telephone line and the local fax (facsimile) machine (transceiver). DAA 12 comprises the signal conditioning and protection devices required by the Rules and Regulations of FCC, Part 68. With relay 14 in the closed position, the facsimile enhancement apparatus 10 is in parallel with the local facsimile machine. Facsimile enhancement apparatus 10 further comprises a DTMF signal detector 16, fax modem 18 and a DTMF signal generator 20 connected in parallel between DAA 12 and CPU 22. It will be appreciated that the DTMF signal detector 16 and the DTMF signal generator 20 can be separate chips or can be incorporated into the chip of the fax modem 18. As the name implies, the DTMF signal detector 16 detects any DTMF tones or tone-pair signals received at the DAA 12 from either the telephone line or the local facsimile machine and provides a coded digital output to CPU 22. Whether the CPU 22 reacts to the coded digital input from the DTMF signal detector 16 depends upon the particular coded digital input and the particular program being run at that time. The DTMF signal generator 20 generates the appropriate tone-pair signals upon the receipt of a proper coded digital signal from CPU 22.

CPU 22 is also operatively connected to first memory means 24, second memory means 26, keyboard 28 and LCD display 30. Third memory means 32 is also shown operatively associated with CPU 22. It will be appreciated that the three separate memory means could be comprised of one large memory means but are shown here as separate memories to better depict their individual use and function. In the preferred embodiment, first memory means 24 comprises RAM and includes memory locations which are assigned to each individual which will use the local facsimile machine to receive confidential information with each memory location being referred to as a mailbox or mailbox number. It will be appreciated that first memory means 24 could comprise a hard disk unit of twenty to forty megabytes with appropriate controller. A typical first memory means 24 will include one hundred mailboxes or mailbox numbers.

In the preferred embodiment, second memory means 26 comprises RAM and includes memory locations containing programmable access codes which are assigned to each individual to allow that individual to access and retrieve the confidential information stored in his assigned mailbox or mailbox number location. Battery 34 provides power backup so the access code information will not be lost in case of failure of power to the facsimile enhancement apparatus 10.

Third memory means 32 includes the program instructions, in ROM or EPROM, for the CPU 22 to perform the various tasks required to complete the desired functions of the facsimile enhancement apparatus 10.

The embodiment of the invention disclosed in FIG. 1 includes the following features. The facsimile enhancement apparatus 10 allows reception of facsimile information in a confidential manner from any brand or model of facsimile machine. In the general overall concept, the confidential information is transmitted from a remote facsimile machine to the local facsimile machine. The facsimile enhancement apparatus 10 will intercept the incoming confidential information or message and store the confidential information in an appropriate mailbox in first memory means 24. The reception and storage of confidential information will occur in either of two modes of operation.

The first mode of operation is employed by a single user of a facsimile machine which may be located in an area where other individuals could observe received facsimile messages even though they normally would not be using the facsimile machine to send or receive messages. The single user must prepare or "set up" the facsimile enhancement apparatus 10 so the apparatus will receive all the incoming facsimile information and store it in an appropriate mailbox. The first step is to activate a "Receive into Memory" feature by selecting that feature by depressing the ADDITIONAL FUNCTIONS key on the keyboard 28. The LCD display 30 displays the status of this feature, either ON or OFF. The single user activates or "turns on" this feature by depressing the ENTER key on keyboard 28. The single user then selects the "Enter Access Code" feature by depressing the ADDITIONAL FUNCTIONS key. The LCD display 30 prompts the single user to enter his mailbox number which is not necessary for a single user since the program will default to a generally delivery mailbox if the single user does not enter a mailbox number and proceeds to depress the ENTER key on keyboard 28. The LCD display 30 then prompts the single user to enter a 4-digit access code which will be required when the facsimile information is to be removed from the first memory means 24 and printed out on the local facsimile machine. The user may change the access code by entering the old code followed by a new code. The access code and the status of the "Receive into Memory" feature are stored in second memory means 26 with backup battery 34 connected thereto in case of power failure.

The sender of the confidential facsimile information sends the facsimile information from any facsimile machine in the same manner as a non-confidential facsimile. Special equipment or instructions are not required of or by the sender. In fact, the sender does not even need to know that the single user recipient is going to consider the information as confidential. The DAA 12 detects the incoming ring signal and answers the call by going off hook and placing the normally-closed relay 14 in the open condition as a result of a signal from CPU 22 on line 36 thereby disconnecting the local facsimile machine from the telephone line. Fax modem 18 performs the appropriate "handshake" with the sender's facsimile machine according to CCITT Recommendation G3. Fax modem 18 then converts the analog image data into digital signals which are stored in the general delivery mailbox in first memory means 24. All these functions are performed under control and directions from CPU 22.

The LCD display 30 will show "Memory in Use" when the facsimile enhancement apparatus 10 has stored incoming confidential information. The user can view certain information on the LCD display 30 about the contents of memory such as the date and time of receipt of the information, the number of pages received, the remote facsimile identification, etc.

The second mode of operation is employed when the local facsimile machine has multiple users who will receive confidential information using the same local facsimile machine. In this mode of operation, each individual user must be assigned their own and different mailbox number and a confidential 4-digit access code to permit the removal and printing of the confidential information stored in his particular mailbox. To prepare or "set up" the facsimile enhancement apparatus 10 so each of the multiple users can have his confidential information stored in his mailbox, each user selects the "Enter Access Code" feature using the ADDITIONAL FUNCTIONS key. The LCD display 30 prompts the user to enter his assigned mailbox number. After the mailbox number is entered, the LCD display 30 prompts the user to enter a 4-digit access code which will be requested and needed when printing the confidential information from the memory location (mailbox). Again, the user may change his access code by entering the old code followed by a new 4-digit code. The access code is stored in second memory means 26.

In this mode, the sender of the facsimile information must be aware that the recipient wants to handle the received facsimile as confidential information and therefore needs to know the mailbox number of the recipient but can use any make or model facsimile machine that meets CCITT Recommendations for G3. Delivery command signals from the sender allows and directs the facsimile enhancement apparatus 10 to intercept the facsimile information and store same in the correct mailbox in the local facsimile machine used by the recipient. These delivery command signals are comprised of predetermined DTMF tones or tone-pair signals entered via the usual keypad of the TOUCH-TONE (DTMF) telephone associated with the facsimile machine used by the sender. The sender dials the telephone number of the recipient's facsimile machine and when the recipients' facsimile machine answers, depresses the * key, then enters the 2-digit mailbox number and then depresses the # key on the keypad of the telephone handset.

Figure 2:
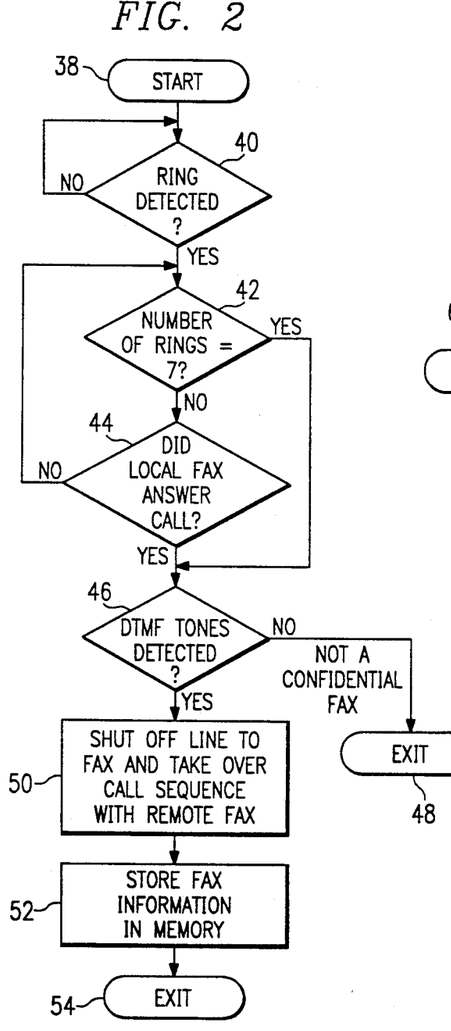
FIG. 2 is a simplified flow chart showing the sequence of steps for the reception of confidential information.

The sequence of the primary steps for the reception of confidential information will be discussed with reference to FIG. 2. After START 38 of the routine, in step 40, the facsimile enhancement apparatus 10 constantly listens in a loop for a telephone ring on the line. In step 42, the number of rings are counted and if the number of rings is less than seven then in step 44 the determination is made as to whether the local facsimile machine answered the incoming call. If the local facsimile answered the call, then in step 46 the facsimile enhancement apparatus 10 listens for the DTMF tone denoting the * sign. If the number of rings counted in step 42 is at least seven and the local facsimile machine has not answered the incoming call, the facsimile enhancement apparatus 10 will answer the call and will listen for the DTMF tone denoting the sign. If a DTMF tone denoting the * sign is not detected, the facsimile enhancement apparatus 10 determines that it is not a confidential facsimile message and that something is wrong with the local facsimile and is presumed to be inoperative so the facsimile enhancement apparatus 10 will accept the facsimile message and store it in the general delivery mailbox in first memory means 24. If the DTMF tone denoting the * sign is detected in step 46, then the facsimile enhancement apparatus 10 answers the incoming call by going off hook and placing the normally-closed relay 14 in the open condition and will capture the mailbox number. Fax modem 18 performs the appropriate "handshake" with the sender's facsimile machine according to CCITT Recommendation G3 in step 50 and apparatus 10 will store the received facsimile information in the designated mailbox in first memory means 24 in step 52 and will EXIT the program via step 54.

The LCD display 30 will show "Memory in Use" when at least one confidential facsimile message has been received. The facsimile enhancement apparatus 10 can also print a notification on the local facsimile machine which will include the time the facsimile message is received, the number of the mailbox in which the message is stored and the sender ID. This notification is printed automatically when the facsimile message is received if the "Confidential Report" feature is activated from the keyboard 28. A user may also view an index of the facsimile messages stored in his mailbox by pressing the "VIEW CONTENTS" key on the keyboard 28.

For a single user in the first mode of operation to print-out his message or messages stored in the general delivery mailbox, the single user depresses the "PRINT" key on the keyboard 28. The LCD display 30 prompts the single user to enter his 4-digit access code which is compared to his access code stored in second memory means 26. If the codes match, the facsimile enhancement apparatus 10 will close the relay (if it isn't already closed) to the local facsimile machine and generate a ring signal and will wait for the local facsimile machine to go off hook and answer the call. Apparatus 10 will then transmit the facsimile message according to CCITT Recommendation G3 to the local facsimile machine for printing.

Figure 3:
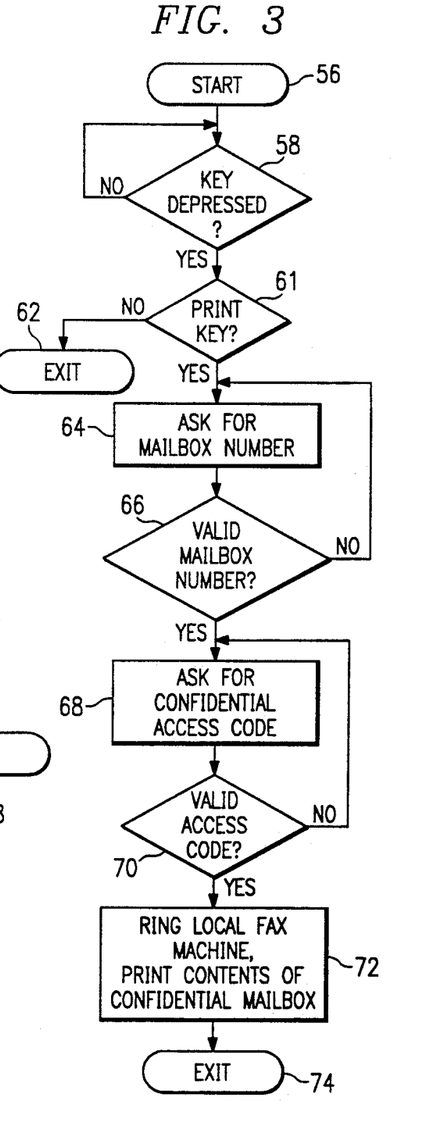
FIG. 3 is a simplified flow chart showing the sequence of steps for the printing of confidential information.

The sequence of the primary steps for the printing of confidential information for a user in the second mode of operation will be discussed with reference to FIG. 3. After START 56 of the routine, in step 58, the facsimile enhancement apparatus 10 constantly monitors in a loop for the depression of a key on the keyboard 28. When a key is depressed, step 61 determines if the key which is depressed is the PRINT key. If the key is not the PRINT key, the apparatus 10 will EXIT the program via step 62. If the key is the PRINT key, then in step 64 the program will prompt (via the LCD display 30) the user for a mailbox number and in step 66 will determine if the entered mailbox number is a valid one. In step 68, the LCD display 30 will prompt the user to enter his 4-digit access code and then in step 70 will determine if the entered access code is valid and matches the access code for that particular mailbox. If it is a valid access code, then in step 72 apparatus 10 rings the local facsimile which will answer the call and the contents (the confidential information) of the mailbox will be printed out on the local facsimile machine and will EXIT the program via step 74. If an error occurs during printing, the error is displayed on the LCD display 30 and the facsimile data or information is retained in memory until a successful printout has occurred.

Figure 4:
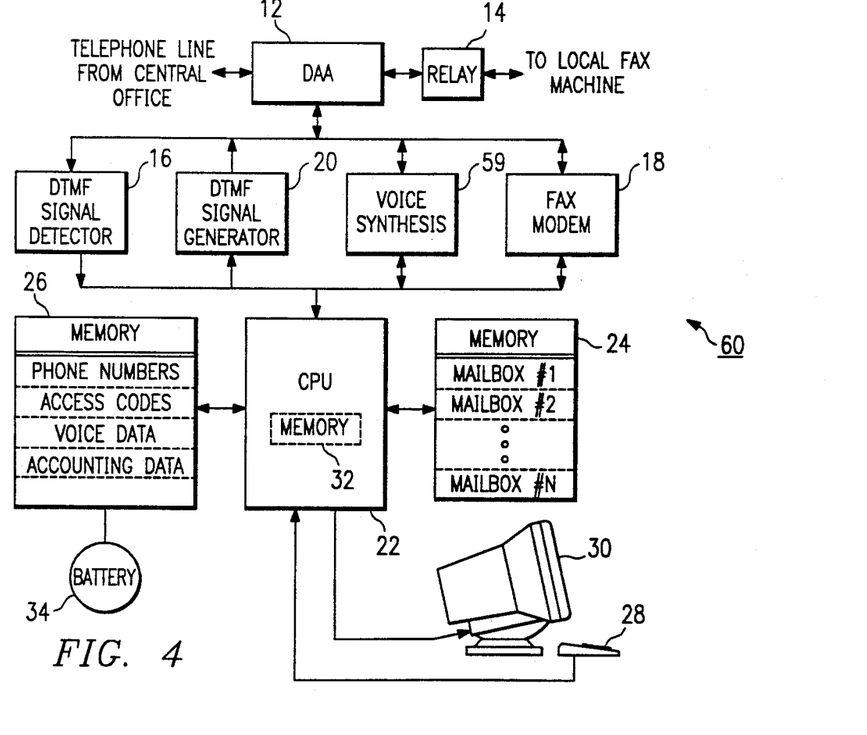
FIG. 4 is a simplified block diagram showing the facsimile enhancement apparatus in accordance with an additional embodiment of the present invention.

With reference to FIG. 4, there is shown an additional embodiment of the facsimile enhancement apparatus generally designated by the reference character 60. This embodiment includes all the apparatus and capability of the first embodiment and in addition includes a voice synthesis device 59 operatively connected between DAA 12 and CPU 22. This embodiment provides the additional capability for notification and delivery of facsimile information to the recipient at a remote location from the local facsimile machine of confidential facsimile information received at the site of the local facsimile machine by the facsimile enhancement apparatus 60. It will be appreciated that the voice synthesis device 58 can be a separate chip or can be incorporated into the chip of the fax modem 18.

Once confidential facsimile information has been stored in the facsimile enhancement apparatus 60, it is important to notify the individual that a facsimile message has been received and has been placed in his mailbox. Each individual user can specify to the facsimile enhancement apparatus 60 the type of notification he wishes to be used regarding his messages. He can "tell" apparatus 60 to call a telephone number and output a voice message notifying him that he has received a facsimile message which has been stored in his mailbox. If the individual has a pager or beeper, he can "tell" apparatus 60 to call his pager or beeper number and output a code to tell him that he has received a facsimile message which has been stored in his mailbox. If he is at a location that has a facsimile machine, he can "tell" apparatus 60 to call the facsimile machine telephone number and send a facsimile message notifying him that he has received a facsimile message which has been stored in his mailbox. If the location is equipped with a voice mail system, apparatus 60 can dial his extension and leave a voice message or select a preprogrammed message to be stored in his voice mailbox.

When the recipient has been notified that a facsimile message has been stored in his mailbox, he may retrieve the facsimile message in several different ways. First, he may have the facsimile message automatically forwarded to another facsimile machine at a remote location. Second, he may call from a facsimile machine at a remote location and instruct apparatus 60 to transmit the facsimile message immediately on the same phone call. Third, he can go to apparatus 60 and request the apparatus 60 to print his facsimile message on the local facsimile machine.

Figure 5:
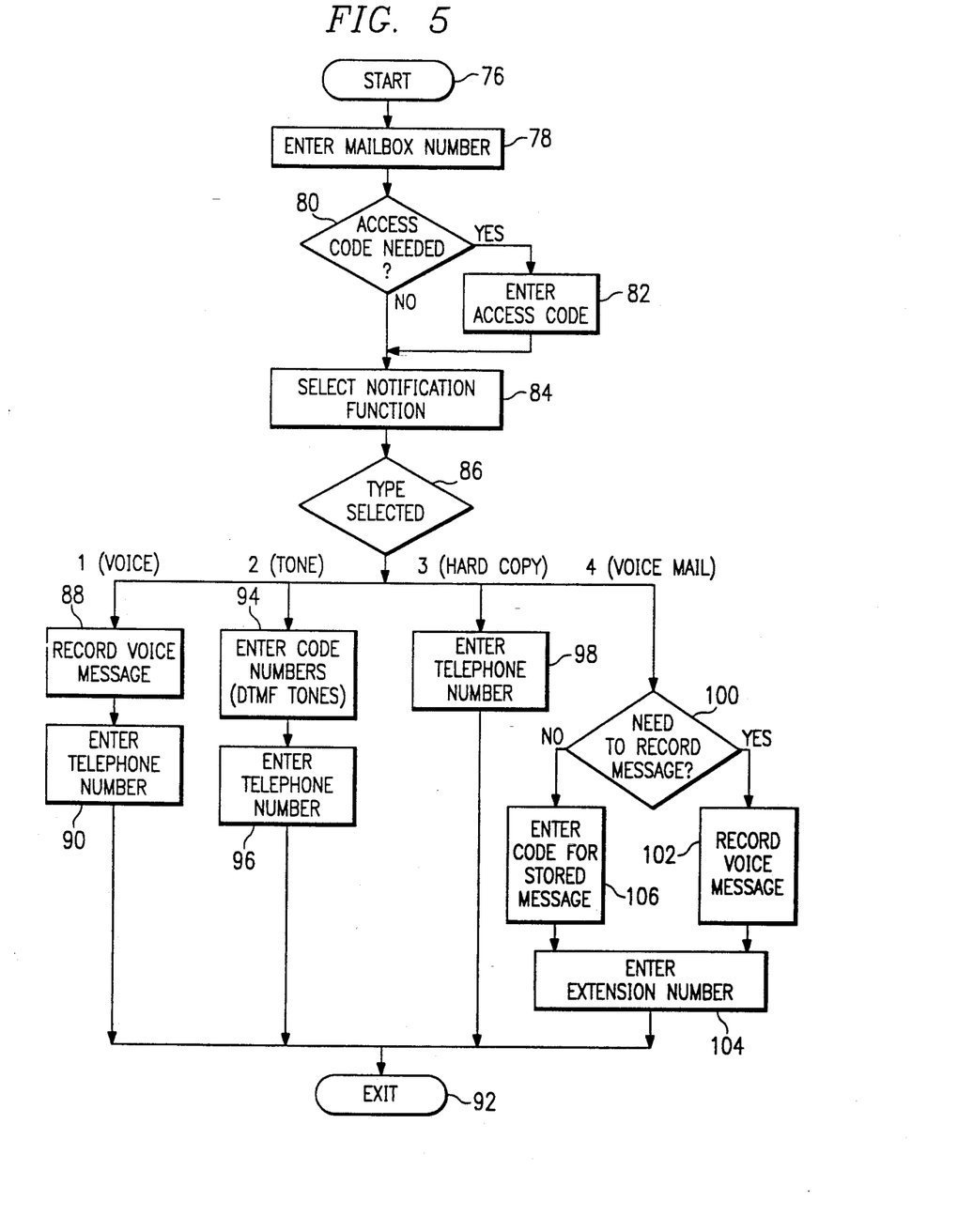
FIG. 5 is a simplified flow chart showing the sequence of steps for setup of this invention for the notification and delivery of facsimile data.

The sequence of the primary steps for the preparation or setup of the facsimile enhancement apparatus 60 for the notification and delivery of facsimile data to the recipient will be discussed with reference to FIG. 5. START 76 of the program is initiated by the user by depressing the ADDITIONAL FUNCTIONS key which selects the "Enter Access Code" feature. In step 78, apparatus 60 via LCD display 30 prompts the user or recipient to enter his mailbox number. Step 80, via LCD display 30, prompts the user in regard to whether an access code is required by the user. If the user desires an access code, it is entered in step 82. In step 84 the user is prompted to select the type of notification he wishes apparatus 60 to use in notifying him that he has received a facsimile message. In step 86, the user selects the type of notification desired.

The LCD display prompts the user to enter, via keyboard 28, a "1" to select voice notification, a "2" to select tone notification, a "3" to select hard copy notification and a "4" to select voice mail notification. If the user selects voice notification, he is prompted via LCD display 30 to enter a voice message in step 88. The user may accomplish this by using the telephone handset of the local facsimile machine or by plugging in an ordinary telephone into apparatus 60. A typical message could be "Bob, you have received a facsimile message". This information is digitized by the fax modem chip 18 and stored in second memory means 26. The user is then prompted by the LCD display 30 to enter the telephone number (step 90) of the remote location at which he wishes to be notified. This telephone number can be changed at any time. Apparatus 60 will then EXIT the program via step 92.

If the user selects tone notification via LCD display 30, he is prompted to enter the DTMF tones to be used as his signal in step 94. In step 96, the user is then prompted by the LCD display 30 to enter the telephone number of the remote location at which he wishes to be notified. Apparatus 60 will then EXIT the program via step 92.

If the user selects the hard copy notification via the LCD display 30, he is prompted to enter the telephone number of the remote location at which he wishes to be notified in step 98. Apparatus 60 will then EXIT the program via step 92.

If the user has access to an internal voice mail system, he may select the voice mail notification from the LCD display 30. He is then prompted in step 100 as to whether he needs to record a voice message. If he desires to record a voice message, this is accomplished in step 102 the same as it was done previously in step 88. In step 104, the user is then prompted by the LCD display 30 to enter the telephone extension number of the location at which he wishes to be notified and apparatus 60 will EXIT the program via step 92. Back at step 100, if the user does not want to record a message but will use one of the prerecorded or preprogrammed messages, then he is prompted to enter the code for the particular prerecorded or preprogrammed messages he desires to use. In step 104, the user is then prompted by the LCD display 30 to enter the telephone extension number of the location at which he wishes to be notified and apparatus 60 will EXIT the program via step 92.

Figure 6:
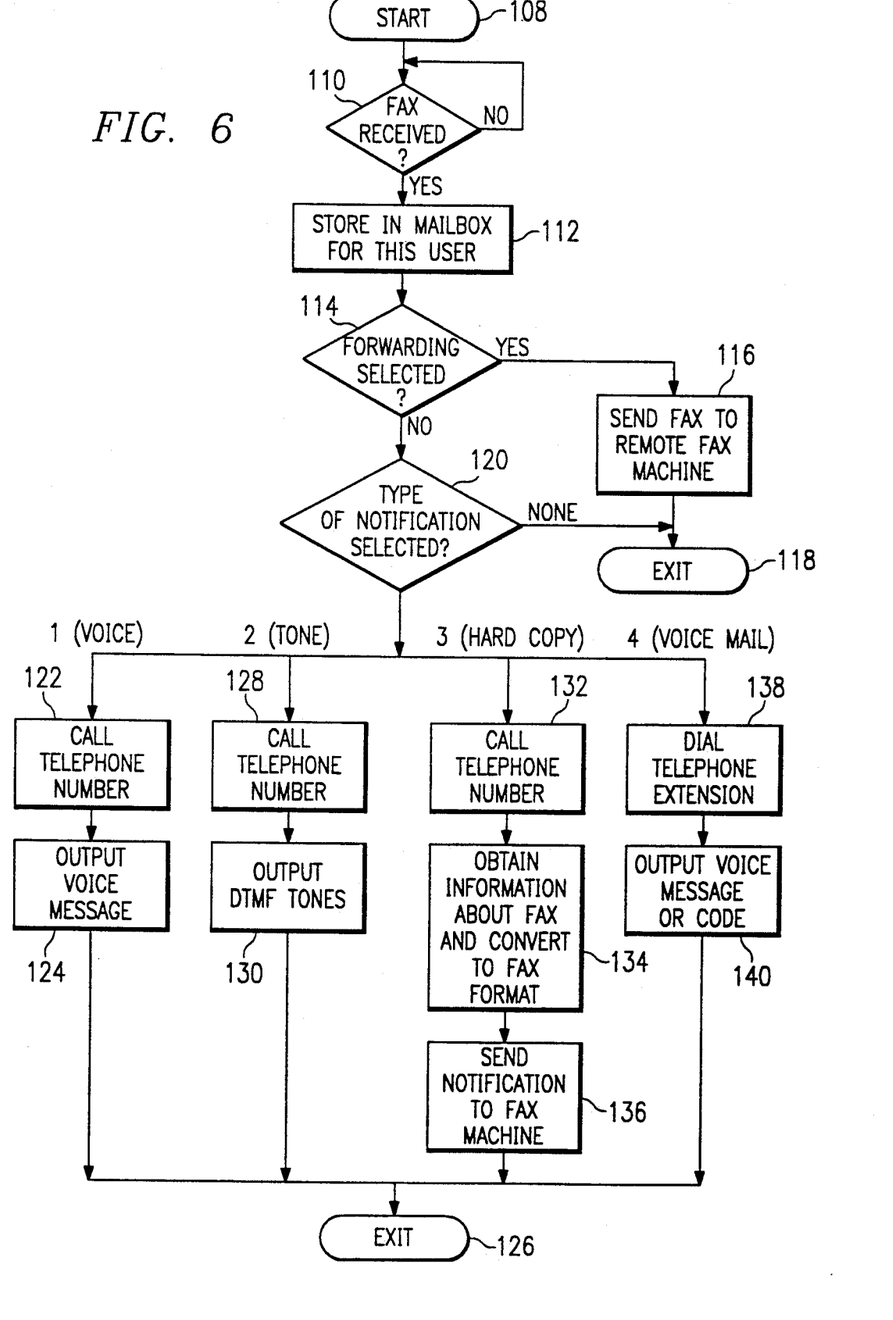
FIG. 6 is a simplified flow chart showing the steps for remote notification of receipt of facsimile data.

The sequence of the primary steps for the notification to and of the user that he has received a facsimile message will be discussed with reference to FIG. 6. After START 108 of the routine or program, the facsimile enhancement apparatus 60 constantly monitors in a loop for the reception of a facsimile message. When a facsimile message is received in step 110, the facsimile message is stored (step 112) in the user or recipient's mailbox and then in step 114 will determine if the user had selected a forwarding feature. If the user had selected the forwarding feature, the facsimile message will be forwarded to the designated remote facsimile machine as set forth in step 116. If the forwarding feature has not been selected, the program will look, in step 120, for the type of notification selected by the user. If a type of notification has not been selected, apparatus 60 will EXIT the program via step 118.

If the user had selected voice notification, apparatus 60 will call the telephone number (step 122) defined during the setup. When the telephone call is answered, the voice message (also defined during setup) is output in step 124 over the telephone line and apparatus 60 will EXIT the program via step 126.

If the user had selected tone notification, apparatus 60 will call the telephone number (step 128) defined during the setup and output the DTMF tones (step 130), defined during setup, over the telephone line and apparatus 60 will EXIT the program via step 126.

If the user had selected the hardcopy notification, apparatus 60 will call the telephone number (step 132) of the remote facsimile machine defined during the setup. In step 134, information is obtained about the receipt of the facsimile message and is converted to facsimile format and in step 136 a notification is sent to the remote facsimile machine where it is printed in hardcopy. The notification shows the time of arrival of the facsimile message back at the recipient's facsimile machine, the remote facsimile identification of the sender and the number of pages received. Apparatus 60 will then EXIT the program via step 126.

If the user had selected voice mail notification, apparatus 60 will dial the extension number (step 138) defined during setup and will leave a recorded message (if there is one) or output a code (step 140) to store a prerecorded message in the user's voice mailbox.

Figure 7:
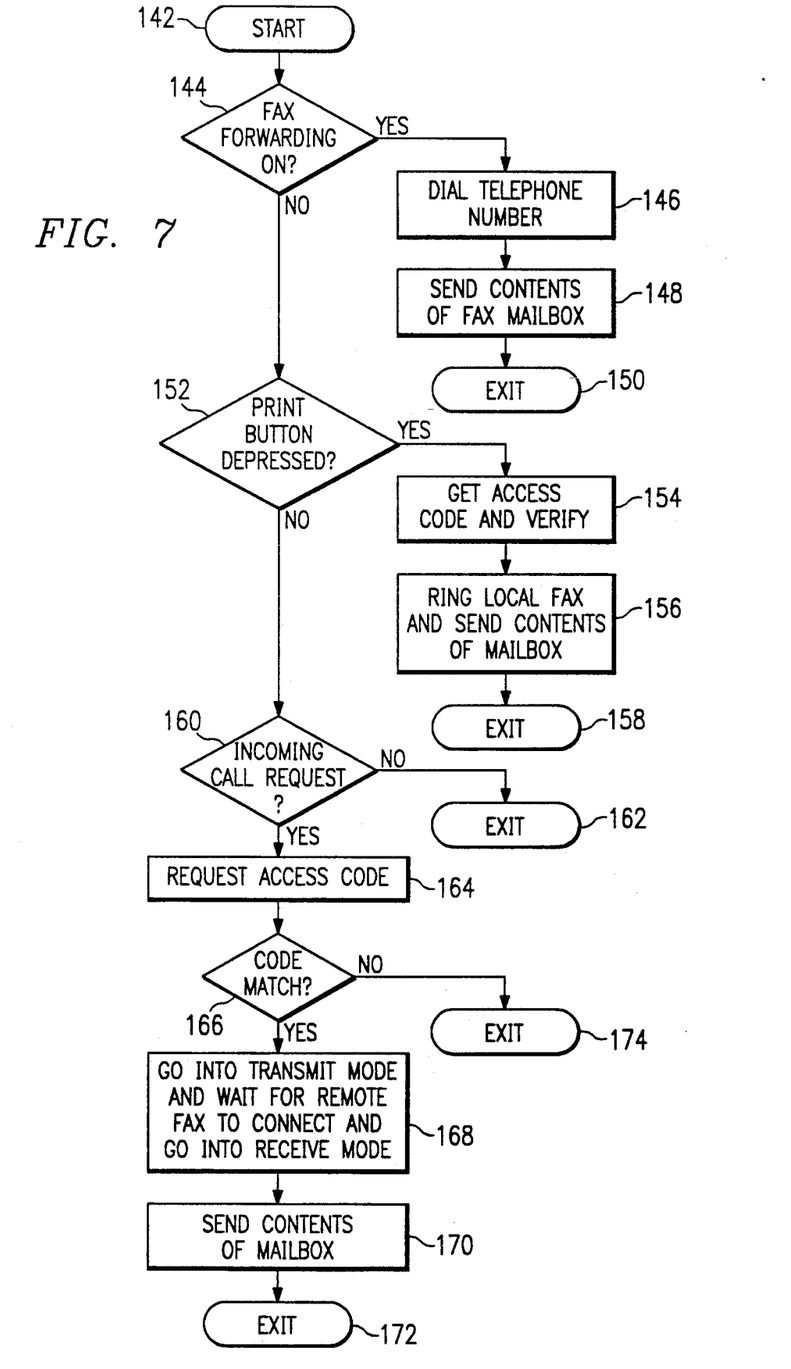
FIG. 7 is a simplified flow chart showing the sequence of steps for retrieval of received facsimile data.

The sequence of the primary steps for the retrieval by the recipient of the facsimile information which has been stored in the facsimile enhancement apparatus 60 will be discussed with reference to FIG. 7. The user may choose to have the facsimile enhancement apparatus 60 to forward all facsimile messages to another location. For example, a user may wish to forward all facsimile messages received after 6 pm to his home. To provide this mode of retrieval, the user selects the "Fax Forward" feature on the keyboard 28. Apparatus 60 prompts the user via the LCD display 30 to enter the telephone number of the remote facsimile machine and the time for the forwarding feature to begin. Thereafter all incoming facsimile messages are forwarded to the designated telephone number until the function is canceled. The telephone number may be changed and/or the function canceled remotely using a telephone keypad. A security code is required for remote operations. After START 142 of the program and upon receipt of a facsimile message, a check is made via step 144 to determine if the facsimile forwarding feature is on or activated for facsimile messages for that particular user. If the facsimile forwarding feature is on, the designated telephone number is dialed in step 146 and in step 148 the facsimile message stored in the user's mailbox will be transmitted in accordance with CCITT standards for facsimile transmission. Then apparatus 60 will EXIT the program via step 150.

If the fax forwarding feature is not on or activated, the program proceeds to step 152 where the keyboard 28 is checked to determine if the PRINT key has been depressed for local retrieval of the facsimile message stored in the user's mailbox. If the PRINT key has been depressed, the user is prompted via the LCD display 30 to enter his mailbox number and his 4-digit access code via keyboard 28 (step 154). Apparatus 60 will then ring the telephone number of the local facsimile machine and transmit the contents of the mailbox to the local facsimile machine (step 156) in accordance with CCITT standards for facsimile transmission. Then apparatus 60 will EXIT the program via step 158.

If the PRINT key has not been depressed, step 160 determines if an incoming call from the user has been received. If not, apparatus 60 will EXIT the program via step 162. If an incoming call from the user has been received and the user has transmitted his 4-digit access code using the telephone keypad, the program will request the access code in step 164 and determine if it matches (step 166) the user's 4-digit access code stored in second memory means 26. If there is a match of the access code, the facsimile enhancement apparatus 60 proceeds to step 168 where apparatus 60 goes into transmit mode and waits for the user at the remote facsimile machine to depress the START button to put the remote facsimile machine into the RECEIVE mode whereupon apparatus 60 will transmit the contents of the user's mailbox (step 170). Then apparatus 60 will EXIT the program via step 172. If the access codes do not match, then apparatus 60 will EXIT the program via step 174.

The present embodiments of this invention include the capability of and for the function of providing accountability for outgoing and, in some instances, incoming facsimile messages from and to the local facsimile machine. This capability and function include but are not limited to the following: (1) account for facsimile machine usage by department and/or by an individual and (2) provide for billing of the particular client (department or individual) for usage of the facsimile machine. The invention functions to maintain an accumulated count of the number of pages processed by the facsimile machine and based upon a predetermined cost per processed page then prints a summary and/or detailed billing report utilizing the facsimile machine as a printer thereby eliminating the need for a separate printer.

Figure 8:
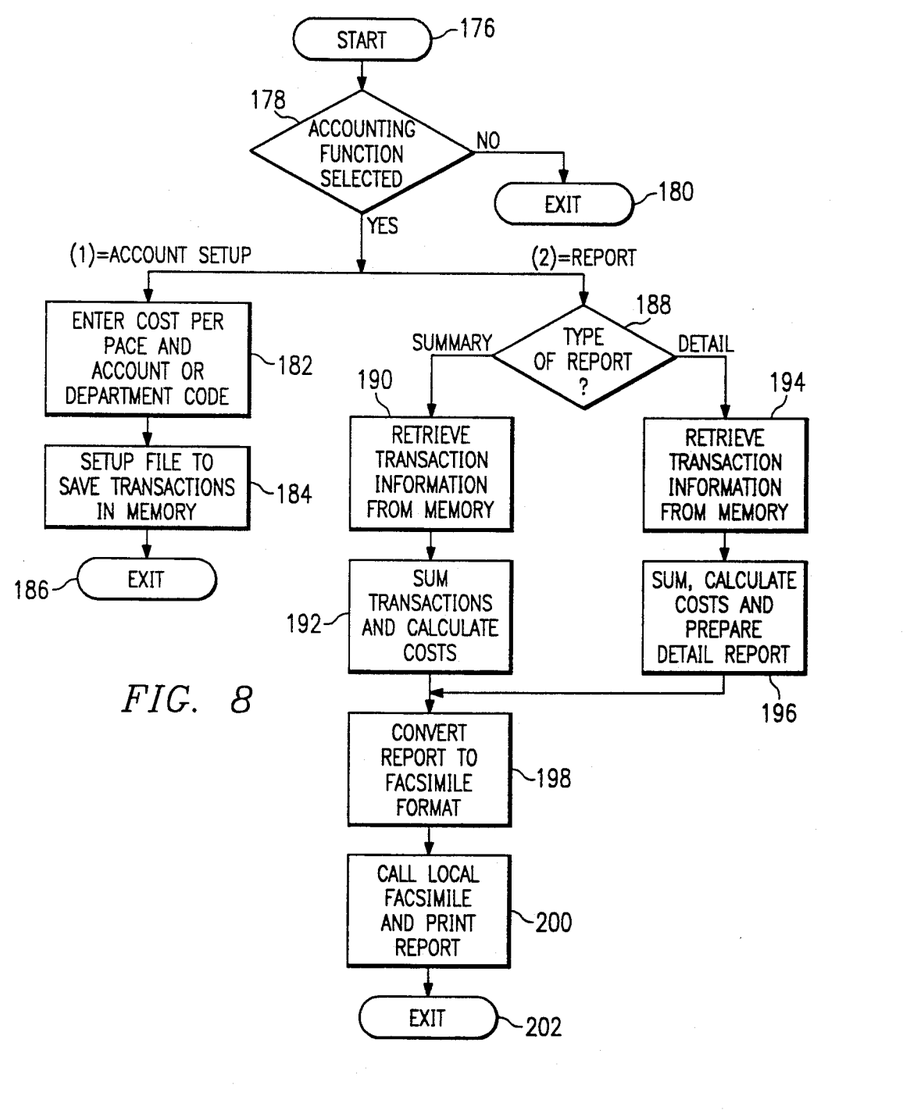
FIG. 8 is a simplified flow chart showing the sequence of steps for the accountability and cost of processed facsimile messages.

The sequence of the primary steps for the preparation or setup of the facsimile enhancement apparatus for the accounting and billing of the usage of the facsimile machine will be discussed with reference to FIG. 8. START 176 of the program is initiated by the user by depressing the ADDITIONAL FUNCTIONS key until the "Accounting Function" is selected and displayed on the LCD display 30 which displays the status of the feature, either ON or OFF in step 178. The feature is selected to "ON" by depressing the ENTER key on keyboard 28. The LCD display 30 prompts the user to enter a "1" on the keyboard 28 to set up an account or department accounting function or feature. The LCD then prompts the user, in step 182, to enter via keyboard 28 "the cost per page, a name and an account or department code number". The account or department code number can be any previously unused number up to 6-digits and can be stored in first memory means 24. The LCD display 30 then prompts the user, in step 184, to enter a memory location code number (which could correspond and be the same as the account or department code number) in second memory means 26 in which to store the particular facsimile transactions for that account or department. The user then EXITS the setup portion via step 186.

The sequence of the primary steps for the printing of a summary and/or detailed report of the cost accounting for the facsimile usage will be discussed with reference to the remaining portion of FIG. 8. After START 176 of the program, if the "Accounting Function" is not selected then a program EXIT will occur in step 180. If the "Accounting Function" is selected in step 178, then the LCD display 30 prompts the user to enter a "2" on the keyboard 28 if the report feature is desired. Step 188 prompts the user (via LCD display 30) to select either "SUMMARY" or "DETAIL" report.

If the "SUMMARY" report is selected, then in step 190, invention retrieves the desired "transaction information from the location in second memory means 26" based on the particular code number entered and in step 192 "the transactions are summarized, costs are calculated and the report is formatted." In step 198, the invention "converts the report information from digital format to facsimile compatible format" and in step 200 "closes relay 14 (if it is not already closed), calls the local facsimile number and transmits the information to the local facsimile machine where the report is printed." The invention will then EXIT the program in step 202.

If the "DETAIL" report is selected, the user is prompted to enter the "up to 6-digit account or department code number" for which the report is desired. In step 194, the desired "transaction information is retrieved from the location in second memory means 26" and in step 196 "the transactions are summarized, costs are calculated and the detail report is formatted." Steps 198, 200 and 202 are performed as detailed above to complete the program.

In summary, it will be appreciated that the invention includes the capability of receiving facsimile data, storing that facsimile data into a predetermined memory location rather than printing the facsimile data out for anyone and everyone to see and then having the capability of notifying the individual, for whom the facsimile data is intended, that he has received a facsimile message and/or data. The invention receives facsimile data in the same manner as does a facsimile machine except the facsimile data is stored into memory rather than being printed on paper. The invention can be directed and controlled by DTMF tones or tone-pairs. The individual user specifies the type of notification he wishes to receive. The individual user can tell the invention to call a particular phone number and output a voice message informing him that he has received a facsimile message. If the user has a pager or beeper, he can tell the invention to call his paper or beeper and output a code to tell him that he has received a facsimile message. If he is at another location which has a facsimile machine, he can tell the invention to call the number of the facsimile machine and send a facsimile message informing him that he has received a facsimile message into his memory location. If the location is equipped with a voice mail system, the invention can dial the user's telephone extension and leave a voice message or select a preprogrammed message to be stored in his voice mailbox.

Although the present invention has been described with reference to a presently preferred embodiment, it will be appreciated by those skilled in the art that various modifications, alternatives, variations, etc., may be made without departing from the spirit and scope of the invention as defined in the appended claims.

We claim:

1. Facsimile enhancement apparatus connected between a CCITT Group 3 facsimile machine and an incoming telephone line to the CCITT Group 3 facsimile machine to intercept a facsimile message in facsimile compatible form which is input on the incoming telephone line and to store the facsimile message in a designated location in memory when said facsimile enhancement apparatus is to directed by delivery command signals received on the incoming telephone line, said facsimile enhancement apparatus is physically located on the premises where the CCITT Group 3 facsimile machine is located, said facsimile enhancement apparatus comprises:

a data access arrangement operatively connected to the incoming telephone line;

a normally-closed relay operatively connected between said data access arrangement and the facsimile machine, the position of said normally-closed relay is controlled by the delivery command signals;

a central processing unit;

a DTMF signal detector means operatively connected between said data access arrangement and said central processing unit to detect the delivery command signals and provide an output to said central processing unit;

a DTMF signal generator means operatively connected between said data access arrangement and said central processing unit to generate DTMF tone signals when so directed by said central processing unit;

a facsimile modem unit operatively connected between said data access arrangement and said central processing unit to convert the facsimile message in facsimile compatible form, when received by said facsimile enhancement apparatus, into digital format and to convert a facsimile message from digital format into facsimile compatible form, when transmitted by said facsimile enhancement apparatus;

first memory means operatively connected to said central processing unit to receive a facsimile message in digital format from said facsimile modem and to store said facsimile message in a predetermined location designated by said delivery command signals; and second memory means operatively connected to said central processing unit to receive and store access codes for the predetermined locations in said first memory means;

whereby an access code must be entered into said facsimile enhancement apparatus for said predetermined location in said first memory means containing said facsimile message and checked against and be the same as the stored access code stored in said second memory means before said facsimile message can be output from said first memory means and transmitted from said facsimile enhancement apparatus to a facsimile machine for printing out a hardcopy of said facsimile message.

2. Facsimile enhancement apparatus of claim 1 further including a voice synthesis device operatively connected between said data access arrangement and said central processing unit.

3. A method for causing a message sent in facsimile compatible form over a telephone system from a first facsimile machine at an origination location to a second facsimile machine, which is operator unattended, at a destination location to be received at the destination location in a confidential manner such that only the intended recipient of the message may view the message, said method comprising the steps of:
   dialing a designated telephone number located at the destination location from a standard telephone keypad at the originating location;
   initiating delivery command signals comprising DTMF tone signals from the standard telephone keypad at the end of the previous dialing step, said delivery command signals identifying that a facsimile message which follows is to be handled in a confidential manner and stored in a predetermined location in a memory means at said destination location;
   decoding said delivery command signals received at said destination location to identify the predetermined location in said memory means in which to store the facsimile message;
   receiving said facsimile message at said destination location; and
   storing said received facsimile message at said destination location in said predetermined location in said memory means determined by said delivery command signals.

4. The method of claim 3 further including the printout of the facsimile message from said memory means on a facsimile machine at said destination location by performing the steps of:
   providing, at said destination location, a location code identifying the predetermined location in said memory means where the facsimile message is stored;
   providing, at said destination location, an access code for the predetermined location in said memory means where the facsimile message is stored which will allow the predetermined location in said memory means to be accessed and the facsimile message to be removed therefrom; and
   printing out said facsimile message, which is in facsimile compatible form, on a facsimile machine at said destination location to provide a hard copy of said facsimile message.

5. The method of claim 3 further including the step of notifying the intended recipient, without an attending operator at the destination location, that a facsimile message has been received in said memory means for said intended recipient.

6. The method of claim 5 wherein said notification includes the steps of:
   calling a predetermined telephone number previously designated by said intended recipient, said predetermined telephone number is a number which is different from the designated telephone number located at the destination location and is at a location remote from said destination location; and
   transmitting a prerecorded voice message when the call to said predetermined telephone number is answered stating that the intended recipient has received a facsimile message.

7. The method of claim 6 wherein said prerecorded voice message is stored in ROM.

8. The method of claim 6 wherein said prerecorded voice message is stored in said memory means.

9. The method of claim 5 wherein said notification includes the steps of:
   calling a predetermined telephone number previously designated by said intended recipient, said predetermined telephone number is a number which is different from the designated telephone number located at the destination location and is at a location remote from said destination location; and
   transmitting predetermined DTMF tone signals to said predetermined telephone number when the call to said predetermined telephone number is answered.

10. The method of claim 9 wherein said transmitted predetermined DTMF tone signals activate a beeper.

11. The method of claim 9 wherein said transmitted predetermined DTMF tone signals activate a paper.

12. The method of claim 5 wherein said notification includes the steps of:
   calling a predetermined telephone number previously designated by said intended recipient, said predetermined telephone number is a number which is different from the designated telephone number located at the destination location and is at a location remote from said destination location; and
   transmitting a message in facsimile compatible form from said destination location when the call to said predetermined telephone number is answered.

13. The method of claim 12 wherein said predetermined telephone number designates a location which is connected to a facsimile machine.

14. The method of claim 3 further including the notification of the intended recipient, located on an internal voice mail system, that a facsimile message has been received in said memory means for the intended recipient and including the steps of:
   calling a predetermined extension number in said internal voice mail system previously designated by said intended recipient; and
   transmitting a prerecorded voice message when said predetermined extension number is answered.

15. The method of claim 5 further including the step of retrieving the facsimile message stored in said memory means after said intended recipient has been notified of the facsimile message.

16. The method of claim 15 wherein said retrieval includes the steps of:
   calling, from a location remote from said destination location, the telephone number where the facsimile message is stored in said predetermined location in said memory means;
   inputting delivery command signals, comprising DTMF tone signals from the standard telephone keypad at a location remote from said destination location, over the telephone system for said predetermined location in said memory means where the facsimile message is stored and which will allow the predetermined location in said memory means to be accessed and the facsimile message to be removed therefrom; and sending to a facsimile-capable receiving device, located at the location from where the telephone call was made in the first step, the facsimile message removed from said predetermined location in said memory means.

17. A method of retrieving facsimile information stored in a predetermined location in a memory means in a confidential manner at an originating location from any facsimile-capable receiving device, said method comprising the steps of:
  calling the telephone number where the facsimile information is stored in a predetermined location in the memory means:
  inputting delivery command signals comprising DTMF tone signals from the standard telephone keypad over the telephone system for said predetermined location in said memory means where the facsimile information is stored in a confidential manner and which will allow the predetermined location in said memory means to be accessed and the facsimile information to be removed therefrom; and
  sending to any facsimile-capable receiving device which meets CCITT standards, located at the location from where the telephone call was made in the first step, the facsimile information removed from said predetermined location in said memory means where the facsimile information is stored in a confidential manner.

18. In facsimile enhancement apparatus connected between a facsimile machine at a destination location and an incoming telephone line to the facsimile machine for intercepting a facsimile message in facsimile compatible form which is input on the incoming telephone line from an originating location and for storing the facsimile message in a designated location in memory when the facsimile enhancement apparatus is so directed by delivery command signals received on the incoming telephone line and including a data access arrangement operatively connected to the incoming telephone line, a normally-closed relay operatively connected between said data access arrangement and the facsimile machine, the position of said normally-closed relay is controlled by the delivery command signals, a central processing unit, a DTMF signal detector means operatively connected between said data access arrangement and said central processing unit, a DTMF signal generator means operatively connected between said data access arrangement and said central processing unit, a facsimile modem unit operatively connected between said data access arrangement and said central processing unit, first memory means operatively connected to said central processing unit to receive a facsimile message from said facsimile modem and to store said facsimile message in a predetermined location designated by said delivery command signals, and second memory means operatively connected to said central processing unit to receive and store access codes for the predetermined locations in said first memory means, a method for causing facsimile message received on the incoming telephone line at the destination location to be received in a confidential manner such that only the intended recipient of the message may view the message, said method comprising the steps of:
  dialing a designated telephone number located at the destination location from a standard telephone keypad at the originating location;
  initiating delivery command signals comprising DTMF tone signals from the standard telephone keypad at the end of the previous dialing step, said delivery command signals identifying that a facsimile message which follows is to be handled in a confidential manner and stored in a predetermined location in the first memory means at said destination location.
  decoding said delivery command signals received at said destination location to identify the predetermined location in said first memory means in which to store the facsimile message;
  receiving said facsimile message at said destination location; and
  storing said received facsimile message at said destination location in said predetermined location in said first memory means determined by said delivery command signals.

* * * * *